United States Patent
Iino

(10) Patent No.: US 10,586,363 B2
(45) Date of Patent: Mar. 10, 2020

(54) OUTPUT PROCESSING DEVICE AND OUTPUT PROCESSING METHOD

(71) Applicant: DENSO TEN Limited, Kobe-shi, Hyogo (JP)

(72) Inventor: Masahiro Iino, Kobe (JP)

(73) Assignee: DENSO TEN Limited, Kobe-shi (JP)

( * ) Notice: Subject to any disclaimer, the term of this patent is extended or adjusted under 35 U.S.C. 154(b) by 0 days.

(21) Appl. No.: 16/123,760

(22) Filed: Sep. 6, 2018

(65) Prior Publication Data

US 2019/0156542 A1 May 23, 2019

(30) Foreign Application Priority Data

Nov. 22, 2017 (JP) ................. 2017-224921

(51) Int. Cl.
*B60K 35/00* (2006.01)
*G06T 11/60* (2006.01)
*G06T 11/00* (2006.01)

(52) U.S. Cl.
CPC .............. *G06T 11/60* (2013.01); *B60K 35/00* (2013.01); *G06T 11/00* (2013.01); *B60K 2370/182* (2019.05); *B60K 2370/1868* (2019.05)

(58) Field of Classification Search
CPC combination set(s) only.
See application file for complete search history.

(56) References Cited

U.S. PATENT DOCUMENTS

| | | | | |
|---|---|---|---|---|
| 5,454,074 A | * | 9/1995 | Hartel | B64G 1/22 434/50 |
| 2014/0250395 A1 | * | 9/2014 | Tanaka | G06F 3/013 715/765 |
| 2015/0120090 A1 | * | 4/2015 | Wischmeyer | B64D 45/00 701/3 |
| 2016/0292620 A1 | * | 10/2016 | De | G06Q 10/063118 |

FOREIGN PATENT DOCUMENTS

JP 2013-171312 A 9/2013
WO 2015/182056 A1 12/2015

* cited by examiner

*Primary Examiner* — Nabil H Syed
*Assistant Examiner* — Cal J Eustaquio
(74) *Attorney, Agent, or Firm* — Oliff PLC

(57) ABSTRACT

An output processing device includes: an accepter which accepts output requests for information that include parameters concerning priority of output of information and parameters concerning output regions for information; and a mediator which, on accepting output requests for a plurality of items of information, mediates the output regions for the plurality of items of information respectively and the output modes of the plurality of items of information respectively based on the parameters concerning priority and the parameters concerning output regions.

15 Claims, 11 Drawing Sheets

OUTPUT PROCESSING DEVICE AND OUTPUT PROCESSING METHOD

This application is based on Japanese Patent Application No. 2017-224921 filed on Nov. 22, 2017, the contents of which are hereby incorporated by reference.

BACKGROUND OF THE INVENTION

1. Field of the Invention

The present invention relates to an output processing device and an output processing method.

2. Description of Related Art

There are known output processing devices that handle information output requests accepted from a plurality of information providing devices (applications) with respect to information to be output to output devices such as display devices. One example of prior art related to such output processing devices is seen in JP 2013-171312 A.

In the conventional video/audio control device disclosed in JP 2013-171312 A, a plurality of kinds of display output are performed in a form distributed among a plurality of video display means, and audio output is performed through an audio output means provided in a vehicle. The video/audio control device performs display output and audio output on an exclusive basis among audio applications that run concurrently. Thus, it is possible to avoid a situation where a plurality of streams of display output and a plurality of streams of audio output by a plurality of audio applications are performed concurrently inside the vehicle's cabin.

However, the prior art disclosed in JP 2013-171312 A suffers from the drawback: for example, two streams of audio output by two audio applications are performed on an exclusive basis, and cannot concur. Depending on the kinds of information accepted from a plurality of information providing devices (applications), there can be cases where their concurrency, that is, concurrent output, helps convey information to the user more effectively. There is concern that this may not be achieved with the prior art mentioned above.

SUMMARY OF THE INVENTION

An object of the present invention is to provide an output processing technology that allows more effective conveyance of information to a user.

According to one illustrative example of the present invention, an output processing device is one that mediates among output requests for information with respect to a plurality of output regions, and includes: an accepter configured to accept the output requests for the information, the output requests respectively including parameters concerning the priority of output of the information and parameters concerning the output regions for the information; a mediator configured to mediate, on accepting the output requests for a plurality of items of information, the output regions for the plurality of items of information respectively and the output modes of the plurality of items of information respectively based on the parameters concerning priority and the parameters concerning output regions.

According to another illustrative example of the present invention, an output processing method is one for mediating among output requests for information with respect to a plurality of output regions, and includes: accepting the output requests for the information, the output requests respectively including parameters concerning the priority of output of the information and parameters concerning the output regions for the information; mediating, on accepting the output requests for a plurality of items of information, the output regions for the plurality of items of information respectively and the output modes of the plurality of items of information respectively based on the parameters concerning priority and the parameters concerning output regions.

DETAILED DESCRIPTION OF PREFERRED EMBODIMENTS

Hereinafter, illustrative embodiments of the present invention will be described in detail with reference to the accompanying drawings. It should be understood that what is disclosed herein is in no way meant to limit the present invention.

1. Configuration of Output Processing System

Figure 1:
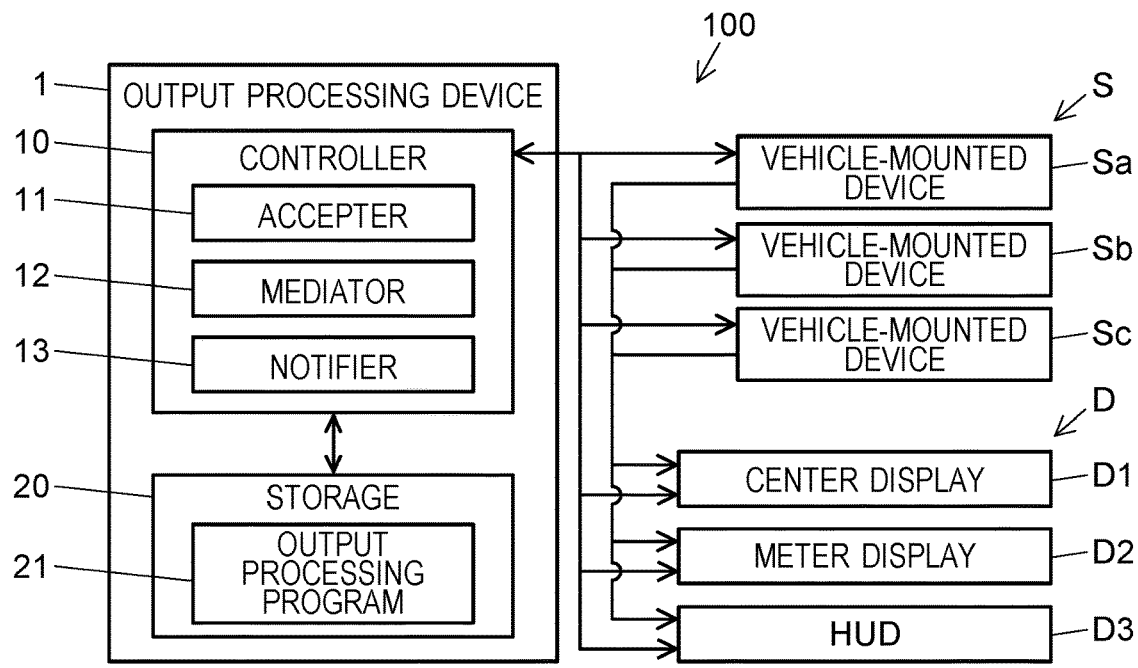
FIG. 1 is a diagram schematically showing the configuration of an output processing system according to one embodiment.
Figure 2:
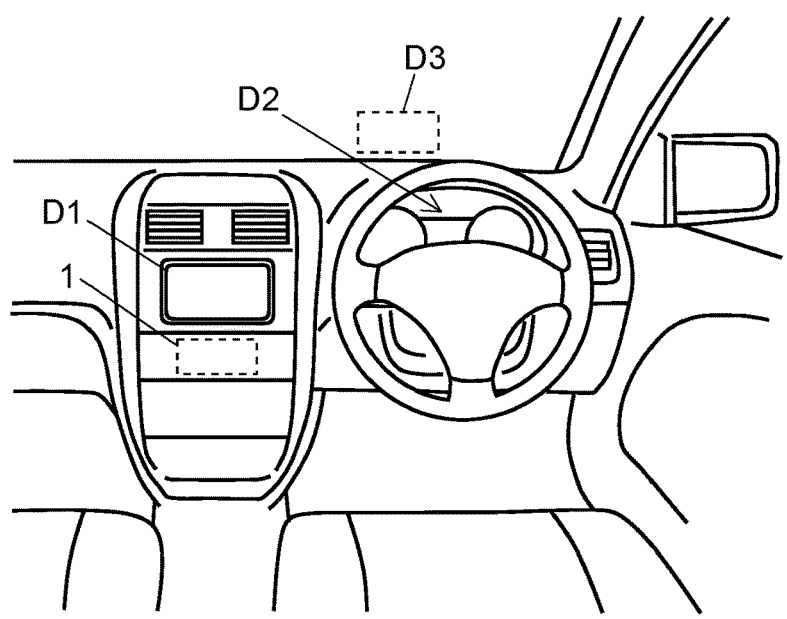
FIG. 2 is a diagram schematically showing part of the interior of the cabin of a vehicle on which the output processing system is mounted.
Figure 3:
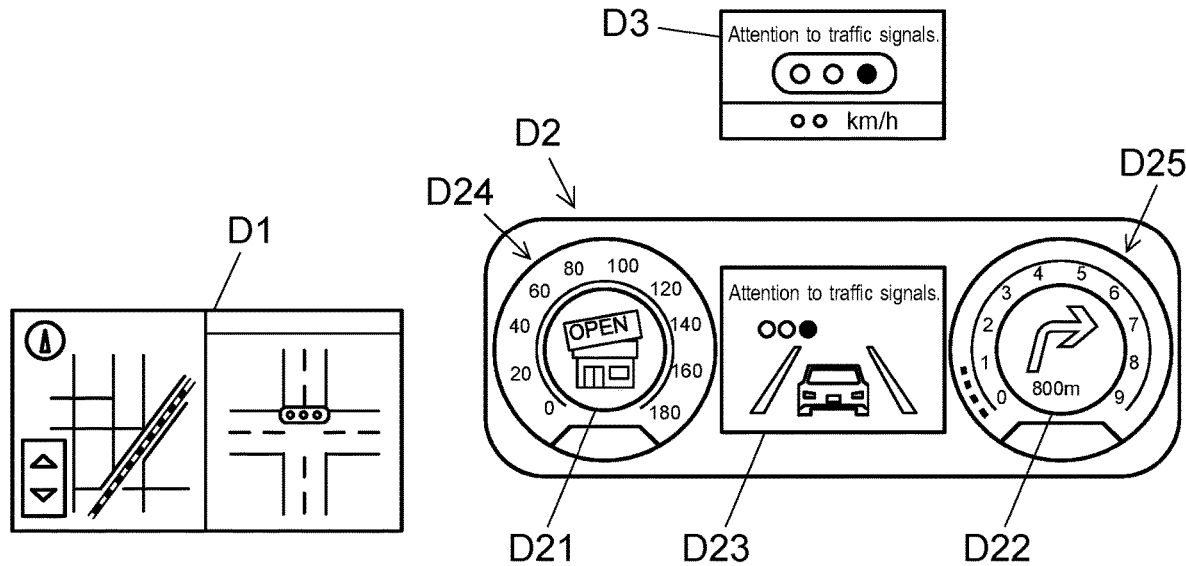
FIG. 3 is a diagram schematically showing the configuration of an output device in the output processing system.

FIG. 1 is a diagram schematically showing the configuration of an output processing system 100 according to one embodiment. FIG. 2 is a diagram schematically showing part of the interior of the cabin of a vehicle on which the output processing system 100 is mounted. FIG. 3 is a diagram schematically showing the configuration of an output device in the output processing system 100. The output processing system 100 is mounted, for example, on a vehicle such as an automobile as shown in FIG. 2.

The output processing system 100 includes an output processing device 1, vehicle-mounted devices Sa, Sb, and Sc, a center display D1, a meter display D2, and a head-up display (HUD) D3. Unless distinction is necessary, any of the vehicle-mounted devices Sa, Sb, and Sc is occasionally referred to simply as a "vehicle-mounted device S"; likewise, any of the center display D1, the meter display D2, and the head-up display D3 is occasionally referred to simply as an "output device D".

The vehicle-mounted devices Sa, Sb, and Sc can each be any of, for example, a car navigation device, an audio device, a television device, a camera device, a vehicle-control ECU (electronic control unit), a vehicle-to-vehicle communication device, a road-to-vehicle communication device, a traffic information reception device, and the like. A vehicle-mounted device S is thus an information providing device that issues an output request to the output processing device 1 for output of information (an image) on an output device D such as the center display D1 in accordance with, for example, user operation and circumstances.

The car navigation system operates, for example, as follows: when a destination is set, it issues to the output processing device 1 an output request for an image showing a route to the destination; at an intersection on the route to the destination, it issues to the output processing device 1 an output request for an image showing the direction of travel.

The audio device and the television device operate, for example, as follows: in accordance with an image received from outside or user operation such as music selection, station selection, volume control, or the like, they issue to the output processing device 1 an output request for an image related to such operation. The camera device operates, for example, as follows: it shoots views forward, rearward, and sideways from the vehicle, and issues to the output processing device 1 an output request for the taken images.

The vehicle-control ECU operates, for example, as follows: it controls the vehicle's direction, speed, and the like in accordance with the driver's driving operation, and issues to the output processing device 1 an output request for information related to the vehicle's control status.

The vehicle-to-vehicle communication device and the road-to-vehicle communication device operate, for example, as follows: in accordance with circumstances such as the presence of other vehicles and pedestrians around the vehicle and the status of traffic signals, they issue to the output processing device 1 an output request for information on those circumstances. The traffic information reception device operates, for example, as follows: in accordance with circumstances such as traffic jams and accidents around the vehicle, it issues to the output processing device 1 an output request for information on those circumstances.

An information output request that a vehicle-mounted device S transmits to the output processing device 1 includes a parameter concerning the priority of output of information on an output device D and a parameter concerning the output region for information.

With respect to the parameter concerning the priority of output of information, the priority for given information is determined beforehand for each vehicle-mounted device S as an information providing device. For example, the priority for a vehicle-mounted device S such as the vehicle-control ECU, the vehicle-to-vehicle communication device, the road-to-vehicle communication device, or the traffic information reception device is higher than the priority for a vehicle-mounted device S such as the car navigation device, the audio device, or the television device.

With respect to the parameter concerning the output region for information, information output devices D can include, for example, the center display D1, the meter display D2, and the head-up display D3 shown in FIGS. 1 to 3.

The center display D1 is arranged between the driver's seat and the front passenger seat. The center display D1 may be the display device of the car navigation device, or may be a display device that is installed separately, for example, on top of the dashboard. The center display D1, when it is the display device of the car navigation device, chiefly displays images related to map information around the vehicle, the route to a destination, guidance on intersections, and the like. Thus, the center display D1 is used for the output of information requested by a vehicle-mounted device S.

The meter display D2 is arranged on the instrument panel on the dashboard. The meter display D2 includes, for example, a speedometer D24 and a tachometer D25 as shown in FIG. 3, and also includes, though not illustrated, an odometer, a water temperature gauge, a fuel gauge, and the like. In a central part of the speedometer D24, a first display portion D21 in a circular shape is provided. In a central part of the tachometer D25, a second display portion D22 in a circular shape is provided. Between the speedometer D24 and the tachometer D25, a third display portion D23 in a rectangular shape is provided.

The first display portion D21 displays, for example, an image related to a suggestion to drop by a shop around the vehicle. The second display portion D22 displays, for example, an image related to guidance on an intersection. The third display portion D23 displays, for example, an image related to information on traffic signals ahead of the vehicle (red signal warning), map information around the vehicle, and the like. Thus, in the meter display D2, the first, second, and third display portions D21, D22, and D23 are used for the output of information requested by a vehicle-mounted device S.

The head-up display D3 is arranged, for example, in a predetermined region on the vehicle's front windshield, in a lower part of it in front of the driver's seat. The head-up display D3 displays an image carrying information by forming the image in such a region on the front windshield as not to interfere driving. The head-up display D3 displays, for example, an image related to information on traffic signals ahead of the vehicle (red signal warning), the current traveling speed, and the like. Thus, the head-up display D3 is used for the output of information requested by a vehicle-mounted device S.

For each of the center display D1, the first, second, and third display portions D21, D22, and D23 of the meter display D2, and the head-up display D3, the information output region can be divided into individual output regions that are smaller compared with the entire region of the screen. A vehicle-mounted device S can as necessary freely determine the size and shape of an information output region on the screen of any of those output devices D, and includes in an information output request a parameter concerning the output region for information. An information output region can be the entire screen of any of the output devices D.

The output processing device 1 includes a controller 10 and a storage 20 as shown in FIG. 1. The output processing device 1 is communicably connected, via an unillustrated communication interface, to the vehicle-mounted devices Sa, Sb, and Sc, the center display D1, the meter display D2, and the head-up display D3.

The controller 10 is a computer including, though none is illustrated, a CPU (central processing unit), RAM (random-access memory), and ROM (read-only memory). In the controller 10, according to an output processing program 21 stored in the storage 20, the CPU performs operational processing and controls the entire output processing device 1 in a concentrated fashion.

The controller 10 includes an accepter 11, a mediator 12, and a notifier 13 as part of the functions realized through operational processing by the CPU according to the output processing program 21.

The accepter 11 accepts from a vehicle-mounted device S an information output request with respect to an output device D. An information output request that the vehicle-mounted devices Sa, Sb, and Sc transmit to the output processing device 1 includes, as mentioned above, a parameter concerning the priority of output of information and a parameter concerning the output region for information. The information output request accepted by the accepter 11 is fed to the mediator 12.

For example, when the mediator 12 accepts an output request from any of the vehicle-mounted devices S while no output device D is outputting information, the mediator 12 stores in the storage 20 the priority contained in the parameter in the output request, and gives an output permission with respect to the output region contained in the parameter in the output request. The result of this processing by the mediator 12 is transmitted via the notifier 13 to the vehicle-mounted device S.

On the other hand, for example, when the mediator 12 accepts an output request from any of the vehicle-mounted devices S while an output device D is outputting information, that is, when the mediator 12 has accepted a plurality of information output requests, the mediator 12 mediates between those output requests. Specifically, with respect to those output requests for a plurality of items of information, based on the parameters concerning the priority of output of information and the parameters concerning the output region for information, the mediator 12 mediates the output regions for the plurality of items of information and the output modes for the plurality of items of information. For given information, its output mode can be, for example, one enabling its output or one disabling its output.

Based on the priority of the information currently being output and the priority of the information targeted by the new output request, the mediator 12 mediates whether to continue outputting the information currently being output or to output, instead, the information targeted by the new output request. That is, the mediator 12 compares the degrees of priority of the two items of information, and gives priority to the output of the information with higher priority over the information with lower priority. Then, based on the output region for the information with higher priority and the output region for the information with lower priority, the mediator 12 mediates in which output regions to output those items of information respectively. The mediation processing will be described in more detail later by way of practical examples. The result of the mediation is transmitted via the notifier 13 to the vehicle-mounted devices S.

The notifier 13 notifies the result of the mediation by the mediator 12 to the vehicle-mounted devices Sa, Sb, and Sc, which are the sources from which output requests originate. This notification is transmitted to the vehicle-mounted devices Sa, Sb, and Sc via the communication interface. The result of the mediation includes parameters indicating the output regions in which information can be output. On receiving the notification, the vehicle-mounted devices Sa, Sb, and Sc perform processing to output information in the output regions specified based on the result of the mediation.

2. Operation of Output Processing Device

Figure 4:
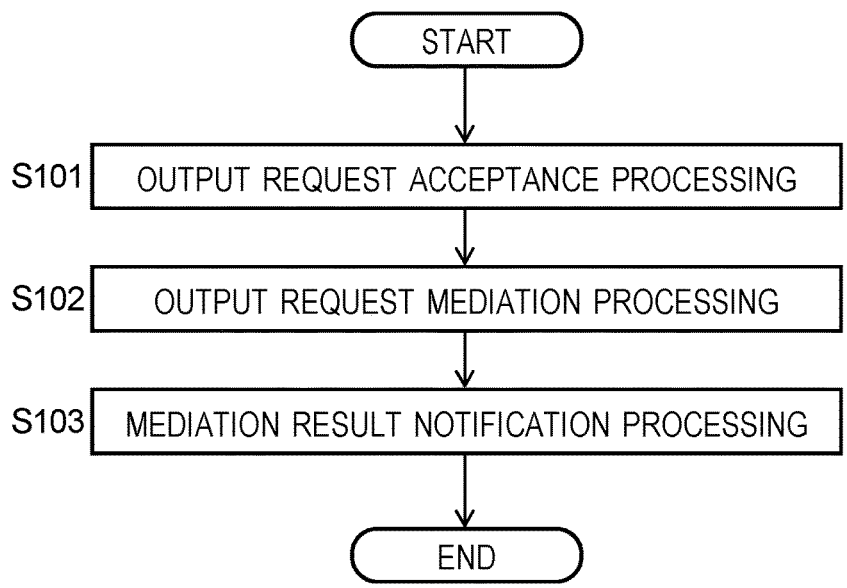
FIG. 4 is a flow chart showing an example of the operation of the output processing device.

Next, the operation of the output processing device 1 will be described. FIG. 4 is a flow chart showing an example of the operation of the output processing device 1.

When the output processing device 1 starts to operate, first, the accepter 11 performs acceptance processing to accept an information output request (step S101). The accepter 11 accepts from a vehicle-mounted device S an information output request with respect to an output device D. The information output request includes a parameter concerning the priory of output of information and a parameter concerning the output region for information.

Next, in response to the information output request, the mediator 12 performs mediation processing (step S102). It should be noted that the mediator 12 performs the mediation processing when it has accepted a plurality of output requests. Based on the parameters concerning priority, the mediator 12 mediates output priority, and then based on the parameters concerning output regions, the mediator 12 mediates output regions. If the mediator 12 accepts an output request that has no overlap (conflict), the mediator 12 stores in the storage 20 the priority included in the output request, and gives an output permission with respect to the output region included in the output request. The mediator 12 outputs the result of the mediation to the notifier 13.

Next, the notifier 13 performs notification processing to notify the result of the mediation (step S103). The notifier 13 notifies the result of the mediation by the mediator 12 to the vehicle-mounted devices Sa, Sb, and Sc, which are the sources from which output requests originate. The result of the mediation includes parameters indicating the output regions in which information can be output.

Then, the output processing device 1 ends the flow of operation shown in FIG. 4. In this way, the output processing device 1 mediates between information output requests with respect to a plurality of output regions.

With the configuration according to the embodiment described above, when the output processing device 1 accepts a plurality of information output requests, the output processing device 1 mediates output priority of information as well as output regions for information, and thereby determines the output regions in which information can be output. Thus, the output processing device 1 can convey information to the user more effectively.

Practical Example 1

3-1. Practical Example 1 of Mediation Processing

Figure 5:
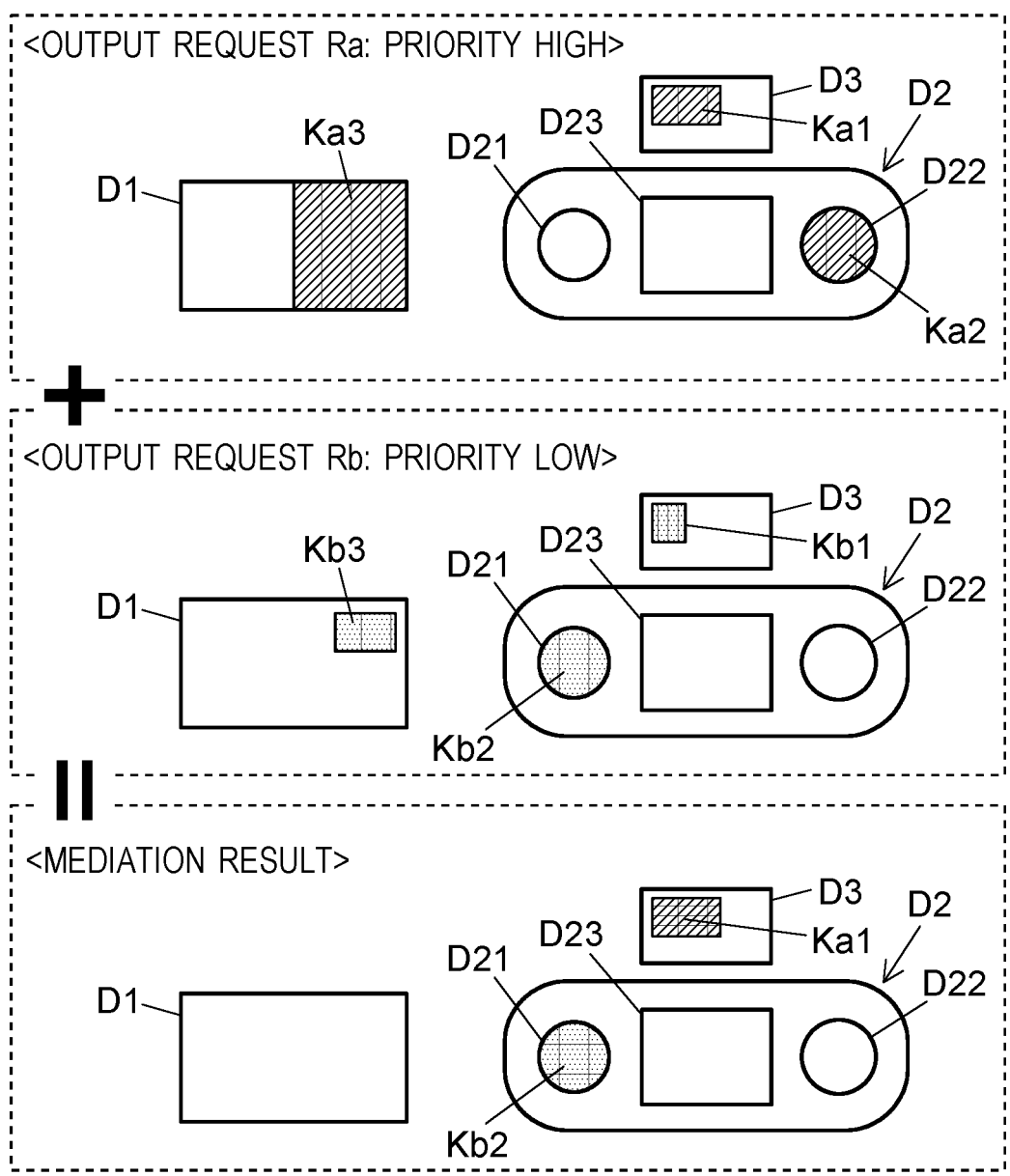
FIG. 5 is a diagram illustrating mediation processing in Practical Example 1.
Figure 6:
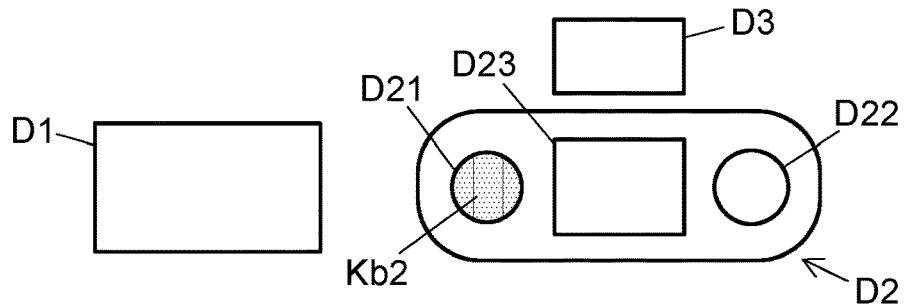
FIG. 6 is a diagram illustrating a state (a first example) after overlap elimination in Practical Example 1.
Figure 7:
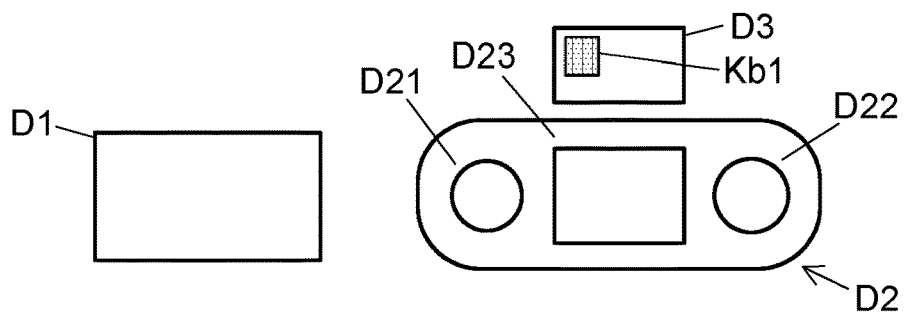
FIG. 7 is a diagram illustrating a state (a second example) after overlap elimination in Practical Example 1.
Figure 8:
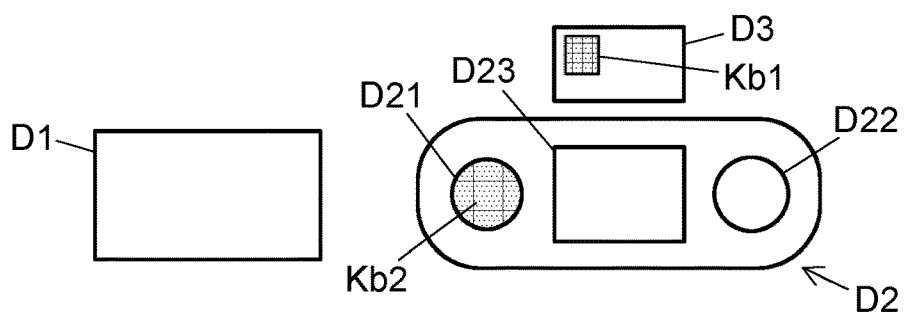
FIG. 8 is a diagram illustrating a state (a third example) after overlap elimination in Practical Example 1.

Next, Practical Example 1 of the mediation processing by the output processing device 1 will be described. FIG. 5 is a diagram illustrating the mediation processing in Practical Example 1. FIGS. 6, 7, and 8 are diagrams illustrating states after overlap elimination in Practical Example 1 (a first, a second, and a third example respectively). The following description deals with a case where there is an overlap between information output requests Ra and Rb that the vehicle-mounted devices Sa and Sb respectively transmit to the output processing device 1.

The information output requests Ra and Rb from the vehicle-mounted devices Sa and Sb include parameters concerning the priority of output of information on the output devices D and parameters concerning the output regions for information. With respect to the parameters concerning priority, the priority of the vehicle-mounted device Sa is higher than the priority of the vehicle-mounted device Sb; thus, the priority of the vehicle-mounted device Sb is lower than the priority of the vehicle-mounted device Sa.

With respect to the parameters concerning output regions for information, the information output requests Ra and Rb from the vehicle-mounted devices Sa and Sb each have a single item of information to output, and each demand one output region. Moreover, in the information output requests Ra and Rb from the vehicle-mounted devices Sa and Sb, the parameters concerning output regions for information include ranks of preference with respect to a plurality of output regions on the output devices D. Here, ranks of preference are the positions of candidates for output regions in the order of how preferable it is to output information there. Here, for example, there is one candidate for an output region in each of the screens of the output devices D. For example, when the information output request Ra has, for output regions, a first candidate Ka1, a second candidate Ka2, and a third candidate Ka3, the lower the number, the higher the rank of preference. This applies equally to any other output request including the output request Rb, and applies equally to the other practical examples described later.

The information output request Ra from the vehicle-mounted device Sa includes three candidates for output regions as shown in FIG. 5, namely a first candidate Ka1, a second candidate Ka2, and a third candidate Ka3. The first candidate Ka1 is arranged in an upper left part of the output region of the head-up display D3, and is a rectangular region covering a predetermined area. The second candidate Ka2 is the entire area of the output region of the second display portion D22 of the meter display D2. The third candidate Ka3 is a rectangular region covering the right half of the output region of the center display D1.

The information output request Rb from the vehicle-mounted device Sb includes three candidates for output regions as shown in FIG. 5, namely a first candidate Kb1, a second candidate Kb2, and a third candidate Kb3. The first candidate Kb1 is arranged in an upper left part of the output region of the head-up display D3, and is a rectangular region covering a predetermined area. The second candidate Kb2 is the entire area of the output region of the first display portion D21 of the meter display D2. The third candidate Kb3 is arranged in an upper right part of the output region of the center display D1, and is a rectangular region covering a predetermined area.

On receiving the information output requests Ra and Rb from the vehicle-mounted devices Sa and Sb as described above, the mediator 12 mediates between the output requests Ra and Rb.

The mediator 12 first mediates output priority based on the parameters concerning priority. In this practical example, the output request Ra with higher priority is given priority over the output request Rb with lower priority. Thus, the mediator 12 assigns the output request Ra the first candidate Ka1 for the information output region. The result of this mediation is transmitted via the notifier 13 to the vehicle-mounted device Sa. On receiving the notification, the vehicle-mounted device Sa performs processing to output information to the first candidate Ka1 which is the output region specified based on the result of the mediation, as shown under the heading <Mediation Result> in FIG. 5.

Subsequently, the mediator 12 mediates output regions based on the parameters concerning output regions. The first candidate Kb1 for the information output region for the output request Rb overlaps with the first candidate Ka1 already determined as the information output region for the output request Ra. Thus, the mediator 12 assigns the output request Rb the second candidate Kb2 for the information output region. The result of this mediation is transmitted via the notifier 13 to the vehicle-mounted device Sb. On receiving the notification, the vehicle-mounted device Sb performs processing to output information to the second candidate Kb2 which is the output region specified based on the result of the mediation, as shown under the heading <Mediation Result> in FIG. 5.

A judgment of whether or not there is an overlap between output region candidates can be made on an output region-by-output region basis as described above, or an output device-by-output device basis.

As described above, in Practical Example 1, the two overlapping output requests Ra and Rb each have a single item of information to output, and their parameters concerning output regions include ranks of preference with respect to a plurality of output regions on the output devices D. Starting with, of the two output requests Ra and Rb, the output request Ra with higher priority, in decreasing order of priority, the mediator 12 first assigns it the first candidate Ka1 for the output region of a higher rank of preference; then, if the output region overlaps, the mediator 12 assigns the output request Rb with lower priority the second candidate Kb2 for the output region of a lower rank of preference. With this configuration, the output processing device 1 can convey information to the user more effectively.

As a first example of the state after the end of the output related to the output request Ra with higher priority, as shown in FIG. 6, the mediator 12 can maintain the output related to the output request Rb with lower priority. That is, after the end and disappearance of the output of information in the first candidate Ka1 for the output region for the output request Ra on the head-up display D3, the mediator 12 maintains the output of information in the second candidate Kb2 for the output region for the output request Rb on the first display portion D21 of the meter display D2. Thus, the user can recognize that the information of the output request Rb is still present on the first display portion D21.

As a second example of the state after the end of the output related to the output request Ra with higher priority, as shown in FIG. 7, the mediator 12 can bring up the output related to the output request Rb with lower priority to the first candidate Kb1 for the output region of a higher rank of preference. That is, after the end and disappearance of the output of information in the first candidate Ka1 for the output region for the output request Ra on the head-up display D3, the mediator 12 switches the output of information in the second candidate Kb2 for the output region for the output request Rb on the first display portion D21 of the meter display D2 to the output of information in the first candidate Kb1 for the output region for the output request Rb on the head-up display D3. This permits the information of the output request Rb to be output in the output region of originally the first preference for the output request Rb, and so the information can be output as desired by the output request Rb. Thus, the information of the output request Rb can be conveyed to the user more effectively.

As a third example of the state after the end of the output related to the output request Ra with higher priority, as shown in FIG. 8, the mediator 12 can add, to the output related to the output request Rb with lower priority, the output in the first candidate Kb1 for the output region of a higher rank of preference. That is, after the end and disappearance of the output of information in the first candidate Ka1 for the output region for the output request Ra on the head-up display D3, the mediator 12 adds, to the output of information in the second candidate Kb2 for the output region for the output request Rb on the first display portion D21 of the meter display D2, the output of information in the first candidate Kb1 for the output region for the output request Rb on the head-up display D3. Thus, the user can recognize that the information of the output request Rb is still present on the first display portion D21. In addition, the information can be output as desired by the output request Rb.

An output request specifies as a first candidate a region that is easily recognizable to the user. Thus, in a case where different output requests Ra and Rb are present simultaneously with respect to the screens of different output devices D, it is preferable to adopt the third example shown in FIG. 8 once the output related to an output request Ra with higher priority ends and an overlap is eliminated.

In a case where the mediator 12 accepts the output request Rb with lower priority before accepting the output request Ra with higher priority, the mediator 12 assigns the output request Rb the first candidate Kb1 for the information output region. That is, the information of the output request Rb is output as shown in FIG. 7. Thereafter, on receiving the output request Ra with higher priority, the mediator 12 mediates as described above, so that the information of the output requests Ra and Rb is output as shown under the heading <Mediation Result> in FIG. 5.

Practical Example 2

3-2. Practical Example 2 of Mediation Processing

Figure 9:
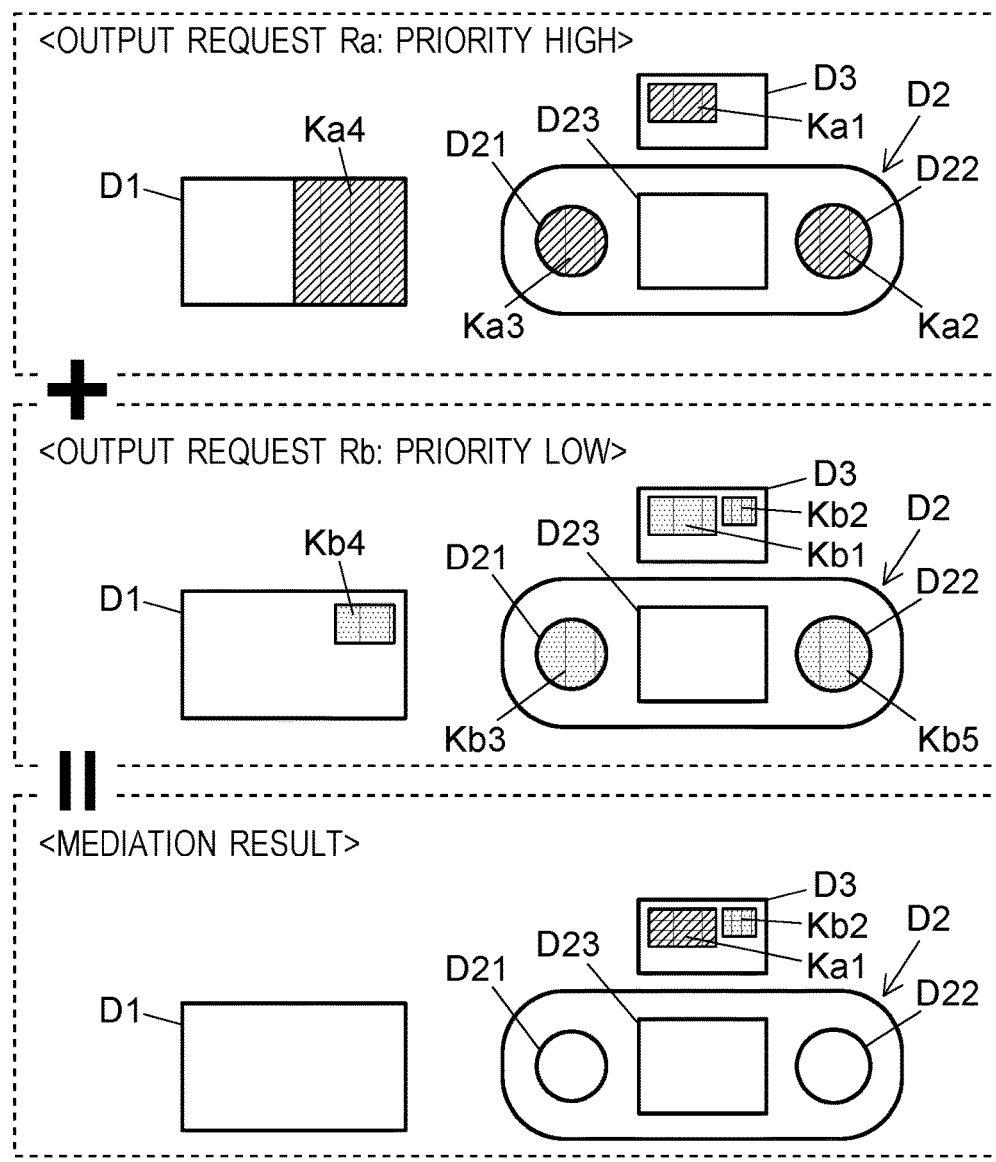
FIG. 9 is a diagram illustrating mediation processing in Practical Example 2.
Figure 10:
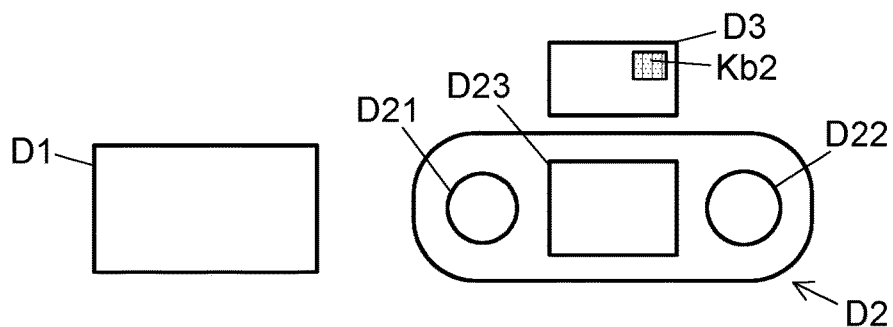
FIG. 10 is a diagram illustrating a state (a first example) after overlap elimination in Practical Example 2.
Figure 11:
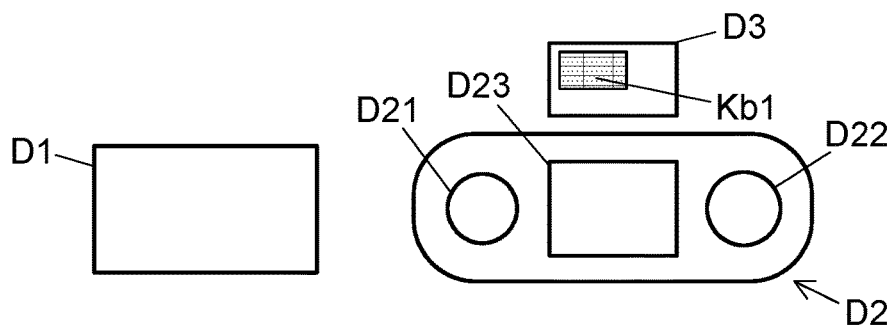
FIG. 11 is a diagram illustrating a state (a second example) after overlap elimination in Practical Example 2.

Next, Practical Example 2 of the mediation processing by the output processing device 1 will be described. FIG. 9 is a diagram illustrating the mediation processing in Practical Example 2. FIGS. 10 and 11 are diagrams illustrating states after overlap elimination in Practical Example 2 (a first and a second example respectively). The following description deals with a case where there is an overlap between information output requests Ra and Rb that the vehicle-mounted devices Sa and Sb respectively transmit to the output processing device 1.

The information output requests Ra and Rb from the vehicle-mounted devices Sa and Sb include parameters concerning the priority of output of information on the output devices D and parameters concerning the output regions for information. With respect to the parameters concerning priority, the priority of the vehicle-mounted device Sa is higher than the priority of the vehicle-mounted device Sb; thus, the priority of the vehicle-mounted device Sb is lower than the priority of the vehicle-mounted device Sa.

With respect to the parameters concerning output regions for information, the information output requests Ra and Rb from the vehicle-mounted devices Sa and Sb each have a single item of information to output, and each demand one output region. Moreover, in the information output requests Ra and Rb from the vehicle-mounted devices Sa and Sb, the parameters concerning output regions for information include ranks of preference with respect to a plurality of output regions on the output devices D. Here, for example, at least one candidate for an output region is provided in each of the screens of the output devices D; that is, a plurality of candidates for output regions can be provided in each of those screens.

The information output request Ra from the vehicle-mounted device Sa includes four candidates for output regions as shown in FIG. 9, namely a first candidate Ka1, a second candidate Ka2, a third candidate Ka3, and a fourth candidate Ka4. The first candidate Ka1 is arranged in an upper left part of the output region of the head-up display D3, and is a rectangular region covering a predetermined area. The second candidate Ka2 is the entire area of the output region of the second display portion D22 of the meter display D2. The third candidate Ka3 is the entire area of the output region of the first display portion D21 of the meter display D2. The fourth candidate Ka4 is a rectangular region covering the right half of the output region of the center display D1.

The information output request Rb from the vehicle-mounted device Sb includes five candidates for output regions as shown in FIG. 9, namely a first candidate Kb1, a second candidate Kb2, a third candidate Kb3, a fourth candidate Kb4, and a fifth candidate Kb5. The first candidate Kb1 is arranged in an upper left part of the output region of the head-up display D3, and is a rectangular region covering a predetermined area. The second candidate Kb2 is arranged in an upper right part of the output region of the head-up display D3, and is a rectangular region covering a predetermined area. The third candidate Kb3 is the entire area of the output region of the first display portion D21 of the meter display D2. The fourth candidate Kb4 is arranged in an upper right part of the output region of the center display D1, and is a rectangular region covering a predetermined area. The fifth candidate Kb5 is the entire area of the output region of the second display portion D22 of the meter display D2.

On receiving the information output requests Ra and Rb from the vehicle-mounted devices Sa and Sb as described above, the mediator 12 mediates between the output requests Ra and Rb.

The mediator 12 first mediates output priority based on the parameters concerning priority. In this practical example, the output request Ra with higher priority is given priority over the output request Rb with lower priority. Thus, the mediator 12 assigns the output request Ra the first candidate Ka1 for the information output region. The result of this mediation is transmitted via the notifier 13 to the vehicle-mounted device Sa. On receiving the notification, the vehicle-mounted device Sa performs processing to output information to the first candidate Ka1 which is the output region specified based on the result of the mediation, as shown under the heading <Mediation Result> in FIG. 9.

Subsequently, the mediator 12 mediates output regions based on the parameters concerning output regions. The first candidate Kb1 for the information output region for the output request Rb overlaps with the first candidate Ka1 already determined as the information output region for the output request Ra. Thus, the mediator 12 assigns the output request Rb the second candidate Kb2 for the information output region. The result of this mediation is transmitted via the notifier 13 to the vehicle-mounted device Sb. On receiving the notification, the vehicle-mounted device Sb performs processing to output information to the second candidate Kb2 for the output region specified based on the result of the mediation, as shown under the heading <Mediation Result> in FIG. 9.

As described above, in Practical Example 2, at least one candidate for an output region is provided in each of the screens of the output devices D, and a plurality of candidates can be provided in each screen. With this configuration, even in a case where a plurality of candidates for output regions are provided in each of the screens of output devices D, the output processing device 1 can convey information to the user more effectively.

As a first example of the state after the end of the output related to the output request Ra with higher priority, as shown in FIG. 10, the mediator 12 can maintain the output related to the output request Rb with lower priority. That is, after the end and disappearance of the output of information in the first candidate Ka1 for the output region for the output request Ra on the head-up display D3, the mediator 12 maintains the output of information in the second candidate Kb2 for the output region for the output request Rb on the head-up display D3. Thus, the user can recognize that the information of the output request Rb is still present on the head-up display D3.

As a second example of the state after the end of the output related to the output request Ra with higher priority, as shown in FIG. 11, the mediator 12 can bring up the output related to the output request Rb with lower priority to the first candidate Kb1 for the output region of a higher rank of preference. That is, after the end and disappearance of the output of information in the first candidate Ka1 for the output region for the output request Ra on the head-up display D3, the mediator 12 switches the output of information in the second candidate Kb2 for the output region for the output request Rb on the head-up display D3 to the output of information in the first candidate Kb1. This permits the information of the output request Rb to be output in the output region of originally the first preference for the output request Rb, and so the information can be output as desired by the output request Rb. Thus, the information of the output request Rb can be conveyed to the user more effectively.

An output request specifies as a first candidate a region that is easily recognizable to the user. Thus, in a case where different output requests Ra and Rb are present simultaneously on the screen of the same output device D, it is preferable to adopt the second example shown in FIG. 11 once the output related to an output request Ra with higher priority ends and an overlap is eliminated. On the other hand, in a case where different output requests Ra and Rb are present simultaneously on the screens of different output devices D, once the output related to an output request Ra with higher priority ends and an overlap is eliminated, as in the third example shown in FIG. 8 in Practical Example 1, in addition to the output of information in the second candidate Kb2 for the output region for the output request Rb, the output of information in the first candidate Kb1 is effected additionally.

In a case where the mediator 12 accepts the output request Rb with lower priority before accepting the output request Ra with higher priority, the mediator 12 assigns the output request Rb the first candidate Kb1 for the information output region. That is, the information of the output request Rb is output as shown in FIG. 11. Thereafter, on receiving the output request Ra with higher priority, the mediator 12 mediates as described above, so that the information of the output requests Ra and Rb is output as shown under the heading <Mediation Result> in FIG. 9.

Practical Example 3

3-3. Practical Example 3 of Mediation Processing

Figure 12:
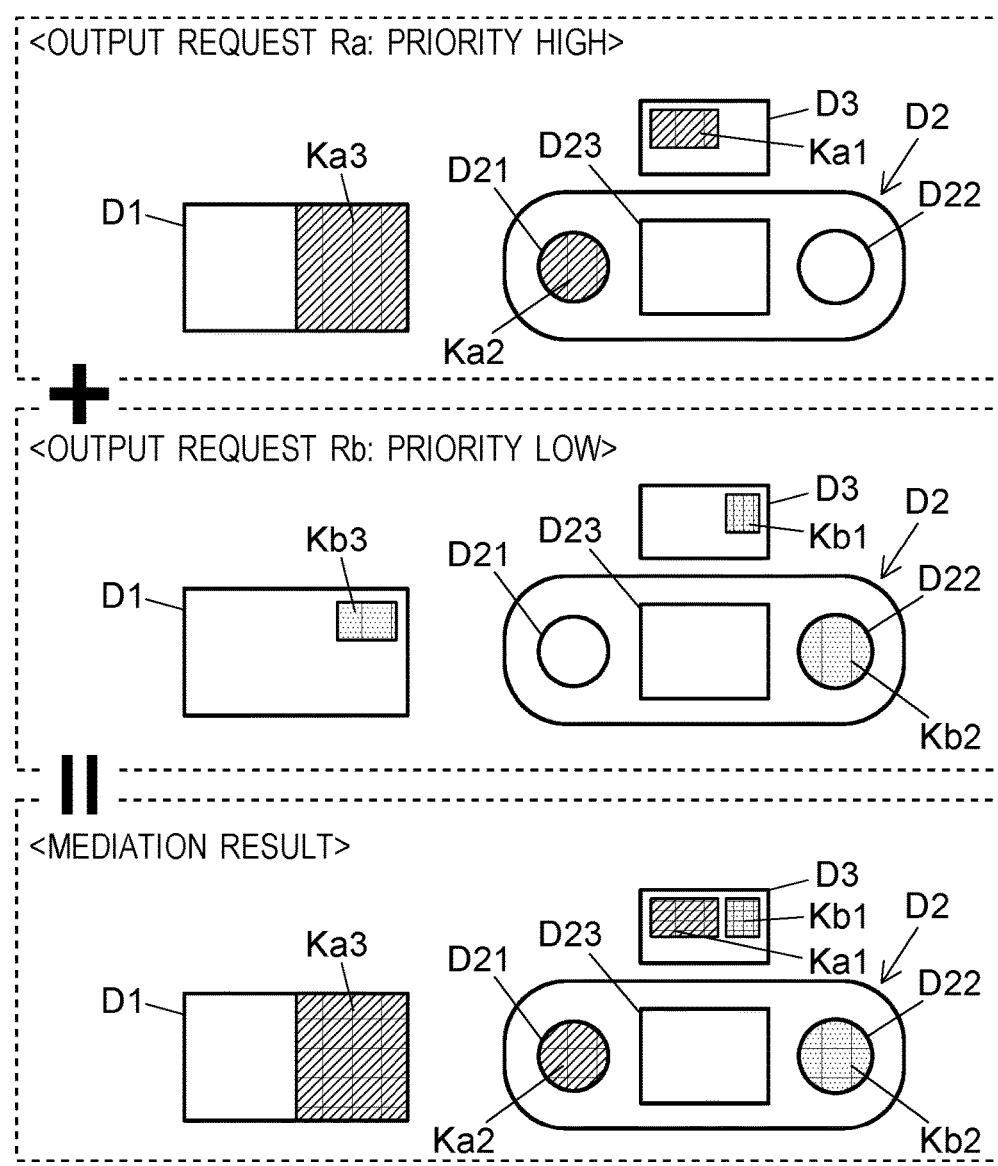
FIG. 12 is a diagram illustrating mediation processing in Practical Example 3.

Next, Practical Example 3 of the mediation processing by the output processing device 1 will be described. FIG. 12 is a diagram illustrating the mediation processing in Practical Example 3. The following description deals with a case where there is an overlap between information output requests Ra and Rb that the vehicle-mounted devices Sa and Sb respectively transmit to the output processing device 1.

The information output requests Ra and Rb from the vehicle-mounted devices Sa and Sb include parameters concerning the priority of output of information on the output devices D and parameters concerning the output regions for information. With respect to the parameters concerning priority, the priority of the vehicle-mounted device Sa is higher than the priority of the vehicle-mounted device Sb; thus, the priority of the vehicle-mounted device Sb is lower than the priority of the vehicle-mounted device Sa.

With respect to the parameters concerning output regions for information, the information output requests Ra and Rb from the vehicle-mounted devices Sa and Sb each have, for example, three items of information to output, and each demand three output regions. Moreover, in the information output requests Ra and Rb from the vehicle-mounted devices Sa and Sb, the parameters concerning output regions for information include candidates for a plurality of output regions on the output devices D. Here, for example, there is one candidate for an output region in each of the screens of the output devices D.

The information output request Ra from the vehicle-mounted device Sa includes candidates Ka1, Ka2, and Ka3 for three output regions as shown in FIG. 12. The candidate Ka1 is arranged in an upper left part of the output region of the head-up display D3, and is a rectangular region covering a predetermined area. The candidate Ka2 is the entire area of the output region of the first display portion D21 of the meter display D2. The candidate Ka3 is a rectangular region covering the right half of the output region of the center display D1.

The information output request Rb from the vehicle-mounted device Sb includes candidates Kb1, Kb2, and Kb3 for three output regions as shown in FIG. 12. The candidate Kb1 is arranged in an upper right part of the output region of the head-up display D3, and is a rectangular region covering a predetermined area. The candidate Kb2 is the entire area of the output region of the second display portion D22 of the meter display D2. The candidate Kb3 is arranged in an upper right part of the output region of the center display D1, and is a rectangular region covering a predetermined area.

On receiving the information output requests Ra and Rb from the vehicle-mounted devices Sa and Sb as described above, the mediator 12 mediates between the output requests Ra and Rb.

The mediator 12 first mediates output priority based on the parameters concerning priority. In this practical example, the output request Ra with higher priority is given priority over the output request Rb with lower priority. Thus, the mediator 12 assigns the output request Ra the candidates Ka1, Ka2, and Ka3 as output regions for three items of information. The result of this mediation is transmitted via the notifier 13 to the vehicle-mounted device Sa. On receiving the notification, the vehicle-mounted device Sa performs processing to output the three items of information in the candidates Ka1, Ka2, and Ka3, respectively, which are the output regions specified based on the result of the mediation, as shown under the heading <Mediation Result> in FIG. 12.

Subsequently, the mediator 12 mediates output regions based on the parameters concerning output regions. The candidates Kb1 and Kb2 for the information output regions for the output request Rb do not overlap with any of the already determined information output regions for the output request Ra. Thus, the mediator 12 assigns the output request Rb the candidates Kb1 and Kb2 as output regions for two items of information. On the other hand, the candidate for the information output region for the output request Rb overlaps with the already determined candidate Ka3 for the information output region for the output request Ra. Thus, the mediator 12 decides to forbid the output requested by the output request Rb in the overlapping candidate Kb3 for the output region. The result of this mediation is transmitted via the notifier 13 to the vehicle-mounted device Sb. On receiving the notification, the vehicle-mounted device Sb performs processing to output the two items of information in the candidates Kb1 and Kb2, respectively, which are the output regions specified based on the result of the mediation, as shown under the heading <Mediation Result> in FIG. 12.

As described above, in Practical Example 3, the two overlapping output requests Ra and Rb each have a plurality of (for example, three) items of information to output. Starting with, of the two output requests Ra and Rb, the output request Ra with higher priority, in decreasing order of priority, the mediator 12 first assigns it the candidates Ka1, Ka2, and Ka3 for the output regions; then, if any of the output regions overlaps, the mediator 12 decides to forbid output in the overlapping candidate Kb3 for the output region for the output request Rb with lower priority. With this configuration, the output processing device 1 can convey information to the user more effectively.

When the output related to the output request Ra with higher priority ends, the mediator 12 permits the output related to the output request Rb with lower priority. That is, the mediator 12 assigns, for the output related to the output request Rb with lower priority, the candidates Kb1, Kb2, and Kb3 as output regions for three items of information. This permits the information of the output request Rb to be output in the output regions originally demanded by the output request Rb, and so the information can be output as the output request Rb desires. Thus, the information of the output request Rb can be conveyed to the user more effectively.

In a case where the mediator 12 accepts the output request Rb with lower priority before accepting the output request Ra with higher priority, the mediator 12 assigns the output request Rb the candidates Kb1, Kb2, and Kb3 for the information output regions. Thereafter, on receiving the output request Ra with higher priority, the mediator 12 mediates as described above, so that the information of the output requests Ra and Rb is output as shown under the heading <Mediation Result> in FIG. 12.

Practical Example 4

3-4. Practical Example 4 of Mediation Processing

Figure 13:
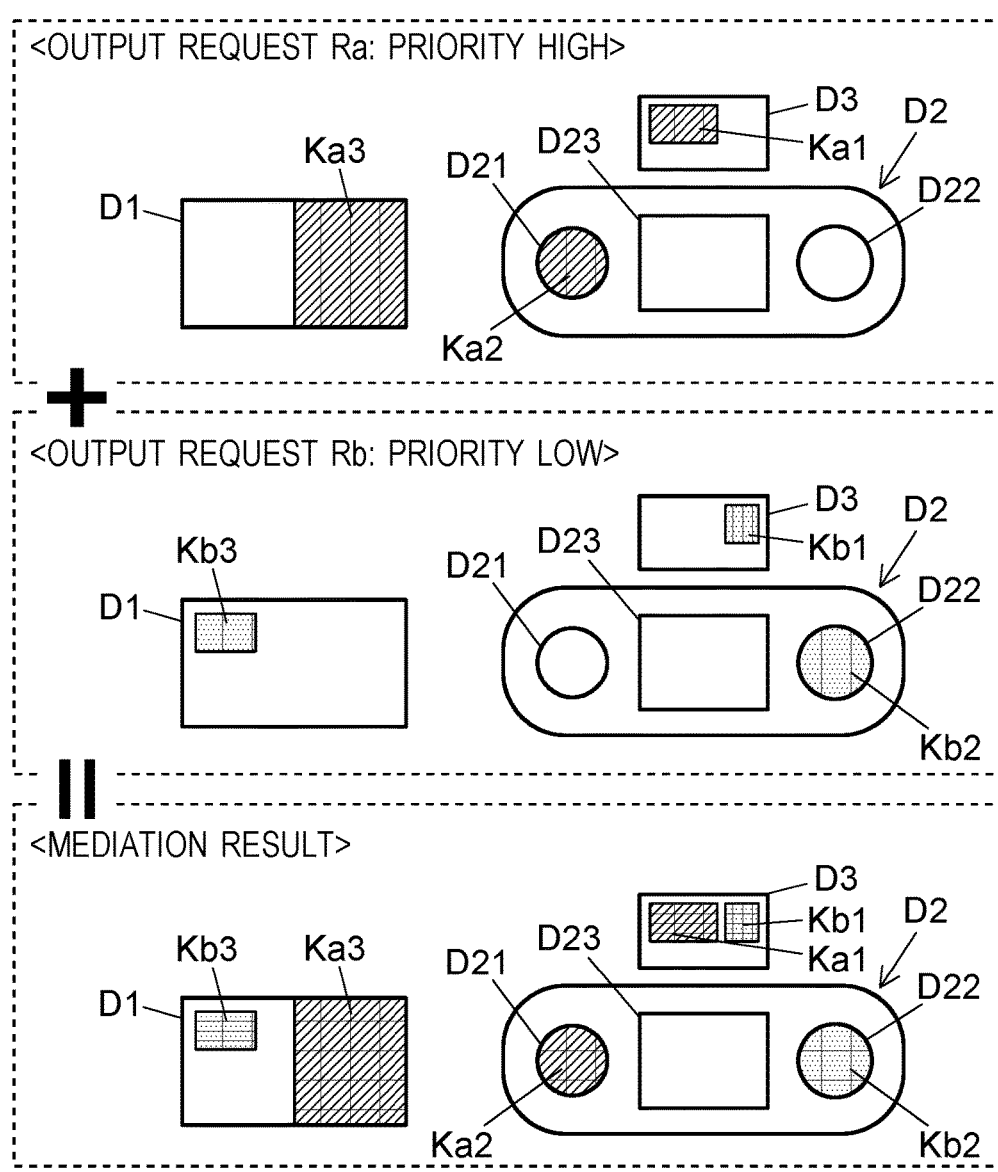
FIG. 13 is a diagram illustrating mediation (a first example) processing in Practical Example 4.
Figure 14:
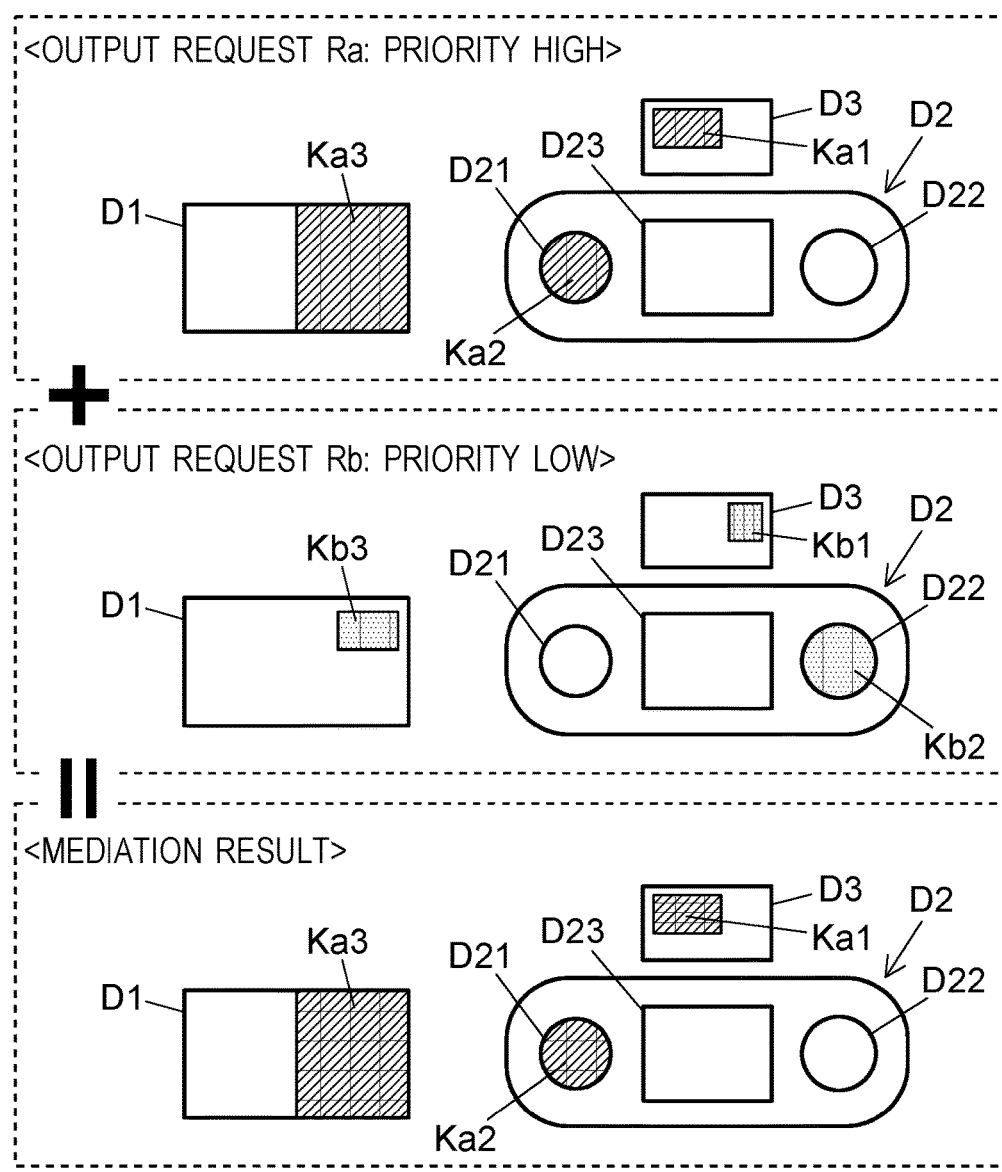
FIG. 14 is a diagram illustrating mediation (a second example) processing in Practical Example 4.

Next, Practical Example 4 of the mediation processing by the output processing device 1 will be described. FIGS. 13 and 14 are diagrams illustrating the mediation processing in Practical Example 4 (a first and a second example respectively).

The information output requests Ra and Rb from the vehicle-mounted devices Sa and Sb include parameters concerning the priority of output of information on the output devices D and parameters concerning the output regions for information. With respect to the parameters concerning priority, the priority of the vehicle-mounted device Sa is higher than the priority of the vehicle-mounted device Sb; thus, the priority of the vehicle-mounted device Sb is lower than the priority of the vehicle-mounted device Sa.

With respect to the parameters concerning output regions for information, the information output requests Ra and Rb from the vehicle-mounted devices Sa and Sb each have, for example, three items of information to output, and each demand three output regions. Moreover, in the information output requests Ra and Rb from the vehicle-mounted devices Sa and Sb, the parameters concerning output regions for information include candidates for a plurality of output regions on the output devices D. Here, for example, there is one candidate for an output region in each of the screens of the output devices D.

In a first example of the Practical Example 4, the information output request Ra from the vehicle-mounted device Sa includes candidates Ka1, Ka2, and Ka3 for three output regions as shown in FIG. 13. The candidate Ka1 is arranged in an upper left part of the output region of the head-up display D3, and is a rectangular region covering a predetermined area. The candidate Ka2 is the entire area of the output region of the first display portion D21 of the meter display D2. The candidate Ka3 is a rectangular region covering the right half of the output region of the center display D1.

The information output request Rb from the vehicle-mounted device Sb includes candidates Kb1, Kb2, and Kb3 for three output regions as shown in FIG. 13. The candidate Kb1 is arranged in an upper right part of the output region of the head-up display D3, and is a rectangular region covering a predetermined area. The candidate Kb2 is the entire area of the output region of the second display portion D22 of the meter display D2. The candidate Kb3 is arranged in an upper left part of the output region of the center display D1, and is a rectangular region covering a predetermined area.

On receiving the information output requests Ra and Rb from the vehicle-mounted devices Sa and Sb as described above, the mediator 12 mediates between the output requests Ra and Rb.

The mediator 12 first mediates output priority based on the parameters concerning priority. In this practical example, the output request Ra with higher priority is given priority over the output request Rb with lower priority. Thus, the mediator 12 assigns the output request Ra the candidates Ka1, Ka2, and Ka3 as output regions for three items of information. The result of this mediation is transmitted via the notifier 13 to the vehicle-mounted device Sa. On receiving the notification, the vehicle-mounted device Sa performs processing to output the three items of information in the candidates Ka1, Ka2, and Ka3, respectively, which are the output regions specified based on the result of the mediation, as shown under the heading <Mediation Result> in FIG. 13.

Subsequently, the mediator 12 mediates output regions based on the parameters concerning output regions. The candidates Kb1, Kb2, and Kb3 for the information output regions for the output request Rb do not overlap with any of the already determined information output regions for the output request Ra. Thus, the mediator 12 assigns the output request Rb the candidates Kb1, Kb2, and Kb3 as output regions for three items of information. The result of this mediation is transmitted via the notifier 13 to the vehicle-mounted device Sb. On receiving the notification, the vehicle-mounted device Sb performs processing to output the three items of information in the candidates Kb1, Kb2, and Kb3, respectively, which are the output regions specified based on the result of the mediation, as shown under the heading <Mediation Result> in FIG. 13.

As described above, in the first example of the Practical Example 4, the two output requests Ra and Rb each have a plurality of (for example, three) items of information to output. If the output requests Ra and Rb have no overlap between them, the mediator 12 assigns the output request Ra the candidates Ka1, Ka2, and Ka3 as output regions for the three items of information, and assigns the output request Rb the candidates Kb1, Kb2, and Kb3 as the output regions for the three items of information.

In a second example of the Practical Example 4, the information output request Ra from the vehicle-mounted device Sa includes candidates Ka1, Ka2, and Ka3 for three output regions as shown in FIG. 14. The candidate Ka1 is arranged in an upper left part of the output region of the head-up display D3, and is a rectangular region covering a predetermined area. The candidate Ka2 is the entire area of the output region of the first display portion D21 of the meter display D2. The candidate Ka3 is a rectangular region covering the right half of the output region of the center display D1.

The information output request Rb from the vehicle-mounted device Sb includes candidates Kb1, Kb2, and Kb3 for three output regions as shown in FIG. 14. The candidate Kb1 is arranged in an upper right part of the output region of the head-up display D3, and is a rectangular region covering a predetermined area. The candidate Kb2 is the entire area of the output region of the second display portion D22 of the meter display D2. The candidate Kb3 is arranged in an upper right part of the output region of the center display D1, and is a rectangular region covering a predetermined area.

On receiving the information output requests Ra and Rb from the vehicle-mounted devices Sa and Sb as described above, the mediator 12 mediates between the output requests Ra and Rb.

The mediator 12 first mediates output priority based on the parameters concerning priority. In this practical example, the output request Ra with higher priority is given priority over the output request Rb with lower priority. Thus, the mediator 12 assigns the output request Ra the candidates Ka1, Ka2, and Ka3 as output regions for three items of information. The result of this mediation is transmitted via the notifier 13 to the vehicle-mounted device Sa. On receiving the notification, the vehicle-mounted device Sa performs processing to output the three items of information in the candidates Ka1, Ka2, and Ka3, respectively, which are the output regions specified based on the result of the mediation, as shown under the heading <Mediation Result> in FIG. 14.

Subsequently, the mediator 12 mediates output regions based on the parameters concerning output regions. Among the candidates Kb1, Kb2, and Kb3 for the information output regions for the output request Rb, the candidate Kb3 overlaps with the already determined candidate Ka3 for the information output region for the output request Ra. Thus, the mediator 12 decides to forbid output in all of the candidates Kb1, Kb2, and Kb3 for the output regions. The result of this mediation is transmitted via the notifier 13 to the vehicle-mounted device Sb. On receiving the notification, the vehicle-mounted device Sb suspends the output of information related to the output request Rb and outputs no information, as shown under the heading <Mediation Result> in FIG. 14.

As described above, in the second example of Practical Example 4, the two overlapping output requests Ra and Rb each have a plurality of (for example, three) items of information to output. Starting with, of the two output requests Ra and Rb, the output request Ra with higher priority, in decreasing order of priority, the mediator 12 first assigns it the candidates Ka1, Ka2, and Ka3 for the output regions; then, if any of the output regions overlaps, the mediator 12 decides to forbid output in all of the candidates Kb1, Kb2, and Kb3 for the output regions for the output request Rb with lower priority. With this configuration, it is possible to restrain, for example, the three mutually closely-associated items of information of the output request Rb from being split up and being output separately on the output devices D.

When the output related to the output request Ra with higher priority ends, the mediator 12 permits the output related to the output request Rb with lower priority. That is, the mediator 12 assigns, for the output related to the output request Rb with lower priority, the candidates Kb1, Kb2, and Kb3 as output regions for three items of information. Thus, for example, the three mutually closely-associated items of information of the output request Rb can be output simultaneously on the output devices D. Moreover, the information of the output request Rb is output in the output regions originally demanded by the output request Rb, and so the information can be output as desired by the output request Rb. Thus, the information of the output request Rb can be conveyed to the user more effectively.

In a case where the mediator 12 accepts the output request Rb with lower priority before accepting the output request Ra with higher priority, the mediator 12 assigns the output request Rb the candidates Kb1, Kb2, and Kb3 for the information output regions. Thereafter, on receiving the output request Ra with higher priority, the mediator 12 mediates as described above, so that the information of the output requests Ra and Rb is output as shown under the heading <Mediation Result> in FIGS. 13 and 14.

Practical Example 5

3-5. Practical Example 5 of Mediation Processing

Figure 15:
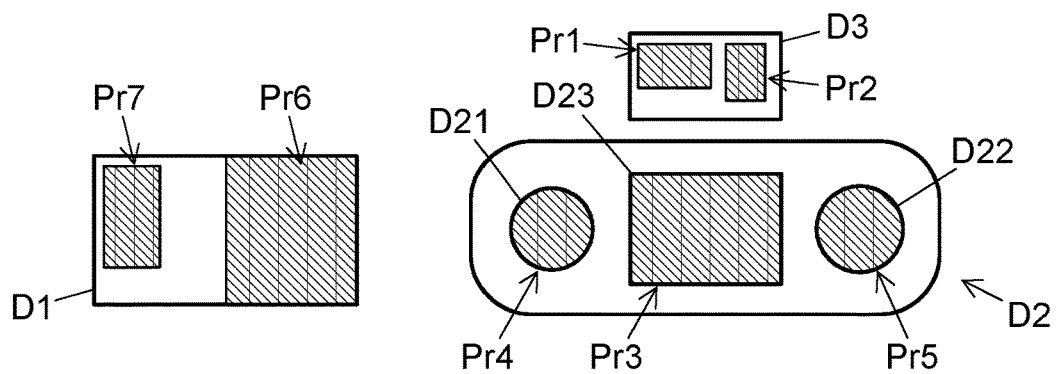
FIG. 15 is a diagram illustrating mediation processing in Practical Example 5.

Next, Practical Example 5 of the mediation processing by the output processing device 1 will be described. FIG. 15 is a diagram illustrating the mediation processing in Practical Example 5. FIGS. 16 to 20 are diagrams (1) to (5) illustrating the transition of output in Practical Example 5. The following description deals with a case where there are overlaps among information output requests that the vehicle-mounted devices Sa, Sb, and Sc respectively transmit to the output processing device 1.

The information output requests from the vehicle-mounted devices S include parameters concerning the priority of output of information on the output devices D and parameters concerning the output regions for information. With respect to the parameters concerning priority, the vehicle-mounted devices Sa, Sb, and Sc are given increasingly low priority in the order of Sa, Sb, and Sc. That is, the priority of the vehicle-mounted device Sa is higher than the priority of the vehicle-mounted devices Sb and Sc, and the priority of the vehicle-mounted device Sb is higher than the priority of the vehicle-mounted device Sc. With respect to the parameters concerning output regions for information, the information output requests from the vehicle-mounted devices Sa, Sb, and Sc each have a single item of information to output, and each demand one output region.

As indicated by hatched regions in FIG. 15, a plurality of output regions are provided in each of the three output devices D. The plurality of output regions over the three output devices D each have priority defined individually beforehand.

In the head-up display D3, for example, for information output requests from the vehicle-mounted devices S, two output regions are provided. One is an output region Pr1 of the first rank of preference; it is arranged in an upper left part of the output region of the head-up display D3, and is a rectangular region covering a predetermined area. The other is an output region Pr2 of the second rank of preference; it is arranged in an upper right part of the output region of the head-up display D3, and is a rectangular region covering a predetermined area.

In the meter display D2, for example, for information output requests from the vehicle-mounted devices S, three output regions are provided. One is an output region Pr3 of the third rank of preference, and is the entire area of the output region of the third display portion D23 of the meter display D2. Another is an output region Pr4 of the fourth rank of preference, and is the entire area of the output region of the first display portion D21 of the meter display D2. The other is an output region Pr5 of the fifth rank of preference, and is the entire area of the output region of the second display portion D22 of the meter display D2.

In the center display D1, for example, for information output requests from the vehicle-mounted devices S, two output regions are provided. One is an output region Pr6 of the sixth rank of preference, and is a rectangular region covering the right half of the output region of the center display D1. The other is an output region Pr7 of the seventh rank of preference; it is arranged in an upper left part of the output region of the center display D1, and is a rectangular region covering a predetermined area.

On receiving the information output requests from the vehicle-mounted devices Sa, Sb, and Sc as described above, the mediator 12 mediates among those output requests.

Figure 16:
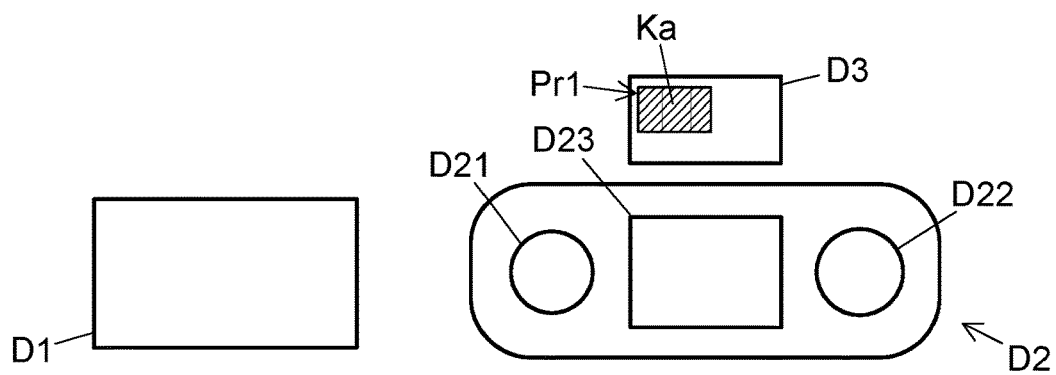
FIG. 16 is a diagram (1) illustrating transition of output in Practical Example 5.

The mediator 12 mediates output priority based on the parameters concerning priority, and then mediates output regions based on the parameter concerning output regions. In this practical example, the output request from the vehicle-mounted device Sa with the highest priority as to output requests is given priority first. The mediator 12 assigns the information Ka of the output request from the vehicle-mounted device Sa the output region Pr1 of the first rank of preference as to output regions. The result of this mediation is transmitted via the notifier 13 to the vehicle-mounted device Sa. On receiving the notification, the vehicle-mounted device Sa performs processing to output the information Ka to the output region Pr1 specified based on the result of the mediation as shown in FIG. 16.

Figure 17:
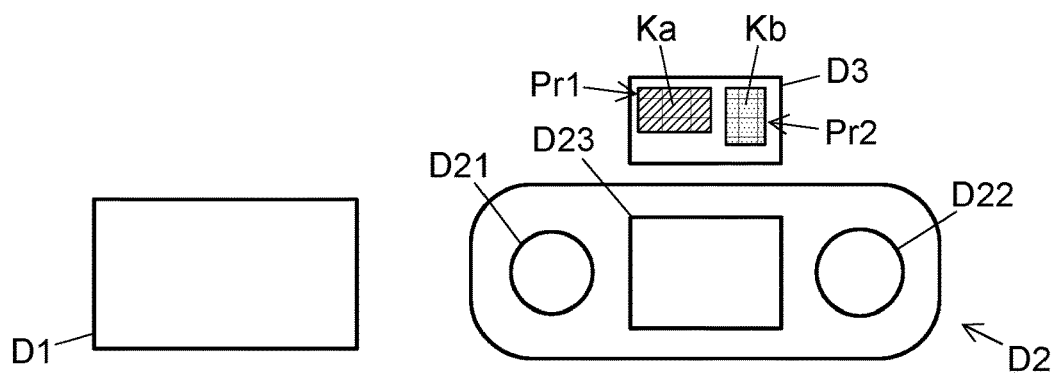
FIG. 17 is a diagram (2) illustrating transition of output in Practical Example 5.

Subsequently, the output request from the vehicle-mounted device Sb with the second highest priority as to output requests is given priority. The mediator 12 assigns the information Kb of the output request from the vehicle-mounted device Sb the output region Pr2 of the second rank of preference as to output requests. The result of this mediation is transmitted via the notifier 13 to the vehicle-mounted device Sb. On receiving the notification, the vehicle-mounted device Sb performs processing to output the information Kb to the output region Pr2 specified based on the result of the mediation as shown in FIG. 17.

Figure 18:
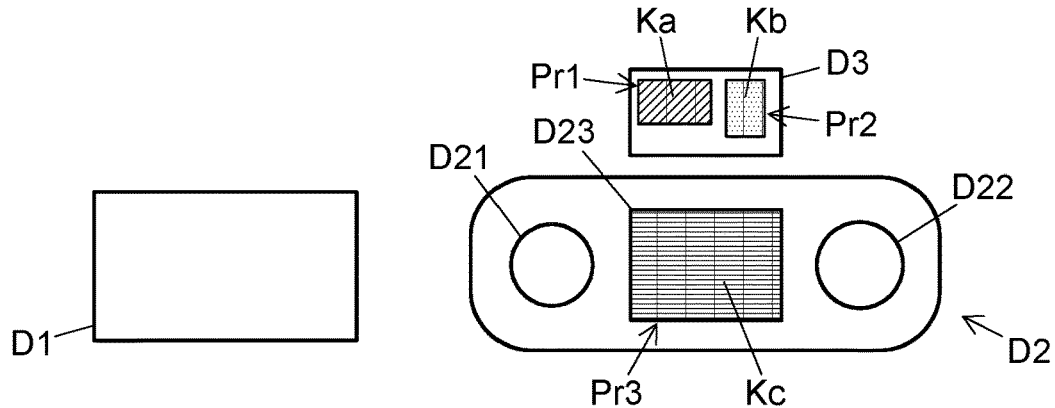
FIG. 18 is a diagram (3) illustrating transition of output in Practical Example 5.

Subsequently, the output request from the vehicle-mounted device Sc with the lowest priority as to output requests is mediated. The mediator 12 assigns the information Kc of the output request from the vehicle-mounted device Sc the output region Pr3 of the third rank of preference as to output requests. The result of this mediation is transmitted via the notifier 13 to the vehicle-mounted device Sc. On receiving the notification, the vehicle-mounted device Sc performs processing to output the information Kc to the output region Pr3 specified based on the result of the mediation as shown in FIG. 18.

In this way, in Practical Example 5, a plurality of output regions are provided on each of a plurality of output devices D, and the plurality of output regions Pr1 to Pr7 over the plurality of output devices D each have priority defined individually beforehand. Starting with, the mediator 12 assigns, in decreasing order of priority among the plurality of output requests, an output request with higher priority an output region of a higher rank of preference. With this configuration, the output processing device 1 can convey information to the user more effectively.

Figure 19:
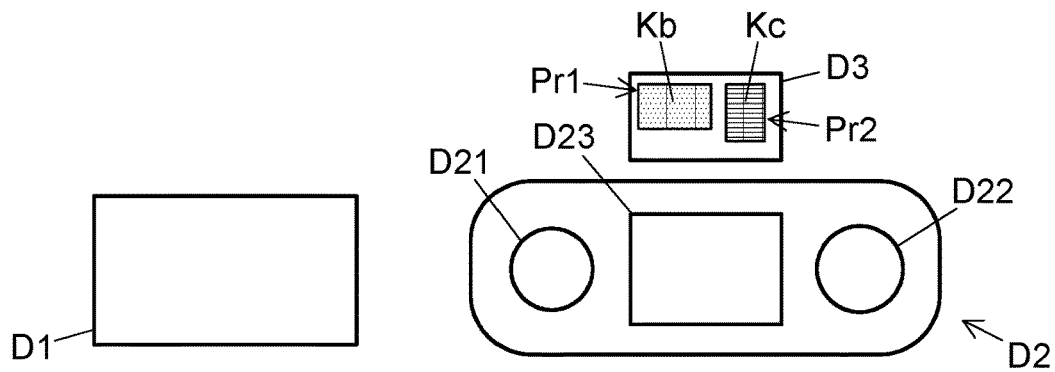
FIG. 19 is a diagram (4) illustrating transition of output in Practical Example 5.
Figure 20:
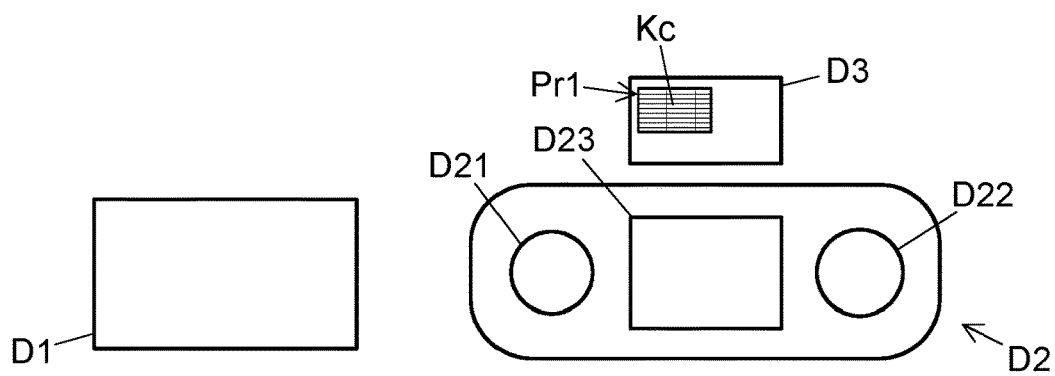
FIG. 20 is a diagram (5) illustrating transition of output in Practical Example 5.

When the output related to an output request with higher priority ends, as shown in FIGS. 19 and 20, the mediator 12 brings up the output related to an output request with lower priority to an output region of a higher rank of preference. Specifically, after the end and disappearance of the output of the information Ka of the output request from the vehicle-mounted device Sa in the output region Pr1 on the head-up display D3, the output of the information Kb of the output request from the vehicle-mounted device Sb in the output region Pr2 is brought up to the output region Pr1, and the output of the information Kc of the output request from the vehicle-mounted device Sc in the output region Pr3 is brought up to the output region Pr2 (see FIG. 19). Thereafter, after the end and disappearance of the output of the information Kb of the output request from the vehicle-mounted device Sb in the output region Pr1 on the head-up display D3, the output of the information Kc of the output request from the vehicle-mounted device Sc in the output region Pr2 is brought up to the output region Pr1 (see FIG. 20). The information of one output request after another thus comes to be output in the output regions of originally the first preference for the respective output requests, and so the information can be output as desired by the output requests. The information of output requests can thus be conveyed to the user more effectively.

4. Modifications and Variations

The various technical features disclosed herein may be implemented in any other manner than in the embodiments described above, and allow for many modifications without departing from the spirit of the present invention. That is, the embodiments described above should be understood to be in every aspect illustrative and not restrictive. The technical scope of the present invention is defined not by the description of the embodiments given above but by the appended claims, and should be understood to encompass any modifications made in the sense and scope equivalent to those of the claims. The plurality of embodiments and practical examples can be implemented in any combinations so long as such combination are feasible.

For example, in the embodiment described above, a parameter concerning the priority of output of information on an output device D and a parameter concerning the output region of information are included in an output request transmitted from a vehicle-mounted device S; instead, as necessary in accordance with circumstances, the mediator 12 may change and determine the priority of output and the candidates for output regions. For example, in a case where there is a restriction such as one forbidding superimposed output of another image on an image taken by the camera device, the mediator 12 can mediate as by giving the image taken by the camera device higher priority and giving other images lower priority. Instead, in such a case, the mediator 12 can mediate as by outputting another image on an output device other than the one on which the image taken by the camera device is output.

In Practical Examples 1 and 2 of the mediation processing, for example, in a case where a plurality of vehicle-mounted devices S, which are information providing devices that issue output requests, each have a plurality of items of information, the plurality of items of information of a given vehicle-mounted device S are each given a rank of priority determined beforehand. For example, in a case where a vehicle-mounted device Sa has a plurality of output requests Rax, Ray, and Raz, the output request Rax is given the first rank of priority, the output request Ray the second rank of priority, and the output request Raz the third rank of priority beforehand. For another example, in a case where a vehicle-mounted device Sb has a plurality of output requests Rbx, Rby, and Rbz, the output request Rbx is given the first rank of priority, the output request Rby the second rank of priority, and the output request Rbz the third rank of priority beforehand.

Then, for example, if there is an overlap among the output regions for a plurality of items of information, the mediator 12 assigns output regions based on the ranks of priority of individual items of information in the vehicle-mounted devices S that issue output requests for those items of information, and if different items of information have the same rank of priority, the mediator 12 can assign output regions based on the ranks of priority of the individual vehicle-mounted devices S. Specifically, for example, in a case where an output request Ray is accepted from the vehicle-mounted device Sa, an output request Rby is accepted from the vehicle-mounted device Sb, and the output regions overlap, the rank of priority of the information of the output request Ray in the vehicle-mounted device Sa and the rank of priority of the information of the output request Rby in the vehicle-mounted device Sb are compared. In this case, the output requests Ray and Rby both have the second rank of priority. Accordingly, then the rank of priority of the vehicle-mounted device Sa that transmitted the output request Ray and the rank of priority of the vehicle-mounted device Sb that transmitted the output request Rby are compared, and the output request Ray with the higher rank of priority is assigned the output region. In this way, in a case where a plurality of vehicle-mounted devices S each have a plurality of items of information, output regions can be assigned based on the rank of priority of each of the plurality of items of information in each of the plurality of vehicle-mounted devices S. Thus, information can be conveyed to the user more effectively.

Moreover, in Practical Examples 1 and 2 of the mediation processing, for example, in a case where the first candidate Kb1 for the output region for the information related to an output request Rb with lower priority does not overlap with the output region assigned to an output request Ra with higher priority, the mediator 12 assigns the output request Rb with lower priority the first candidate Kb1 for the output region for the information related to the output request Rb. That is, the information of the output request Rb is output in the first candidate Kb1 for the output region. This permits the information of the output request Rb to be output in the output region of originally the first preference for the output request Rb, and so the information can be output as desired by the output request Rb. Thus, the information of the output request Rb can be conveyed to the user more effectively.

Moreover, in Practical Examples 1 and 2 of the mediation processing, for example, in a case where the mediator 12 accepts, in addition to the output requests Ra and Rb, a third output request Rc with still lower priority and the output regions overlap, the mediator 12 assigns the third output request Rc with lower priority the output region of the highest rank among the output regions that do not overlap with the output regions for the output requests Ra and Rb with higher priority. For another example, in a case where the first candidate Kc1 for the output region for the information related to the third output request Rc with lower priority does not overlap with the output regions assigned respectively to the output requests Ra and Rb with higher priority, the mediator 12 assigns the third output request Rc with lower priority the first candidate Kc1 for the output region for the information related to that output request Rc. This permits the information of the output request Rc to be output in the output region of originally the first preference for the output request Rc, and so the information can be output as desired by the output request Rc. Thus, the information of the output request Rc can be conveyed to the user more effectively.

Moreover, in Practical Examples 1 and 2 of the mediation processing, for example, in a case where, after mediation, the output regions of the remaining ranks of preference for the respective output requests for a plurality of items of information remain unassigned to other output requests, the mediator 12 can assign the same information that has undergone mediation to the candidates for output regions of other, increasingly low, ranks of preference to have that information output also there. Specifically, the same information related to each of a number of kinds of output requests (Ra, Rb, Rc, . . . ) may be output in a number of output regions redundantly. For example, an output request Ra is assigned a candidate Ka1 as a first output region, an output request Rb is assigned a candidate Ka2 as a first output region, an output request Rc is assigned a candidate Kc1 as a first output region, the output request Ra is assigned a candidate Ka3 as a second output region, the output request Rb is not assigned an output region as a second output region because no unassigned candidate for it is available, and the output request Rc is assigned a candidate Kc3 as a second output region. In this way, until candidates for output regions run out, or a prescribed predetermined number of times repeatedly, the same information related to the output requests Ra, Rb, and Rc is assigned to the candidates for their respective output regions. Thus, the same information of a number of kinds can be output by use of a number of output regions, and the information can be conveyed to the user more effectively.

Although the above description of embodiments assumes that various functions are realized on a software basis through operational processing by a CPU according to a program, part of those functions may be realized with electrical hardware circuits. Reversely, part of functions realized with hardware circuits may be realized on a software basis.

What is claimed is:

1. An output processing device that mediates among output requests for information with respect to a plurality of output regions, the device comprising:

an accepter configured to accept the output requests for the information, the output requests respectively including:
   parameters concerning priority of output of the information and
   parameters concerning the output regions for the information;
a mediator configured to mediate, on accepting the output requests for a plurality of items of information, the output regions for the plurality of items of information respectively and output modes of the plurality of items of information respectively based on the parameters concerning priority and the parameters concerning output regions, wherein
the plurality of output requests each have a single item of information to output,
the parameters concerning the output regions include ranks of preference with respect to the plurality of output regions, and
the mediator is configured to assign, in decreasing order of priority among the plurality of output requests, an output request with higher priority an output region of a higher rank of preference and, if the output region overlaps, to assign an output request with lower priority an output region of a lower rank of preference.

2. The output processing device according to claim 1, wherein
the mediator is configured, when the output regions for the plurality of items of information overlap and priorities of the items of information are the same, to assign the output regions based on respective priorities of the information providing devices.

3. The output processing device according to claim 1, wherein
the mediator is configured, when output related to the output request with higher priority ends, to maintain output related to the output request with lower priority.

4. The output processing device according to claim 1, wherein
the mediator is configured, when output related to the output request with higher priority ends, to move output related to the output request with lower priority to the output region of the higher rank of preference.

5. The output processing device according to claim 1, wherein
the mediator is configured, when output related to the output request with higher priority ends, to additionally effect output related to the output request with lower priority in the output region of the higher rank of preference.

6. The output processing device according to claim 1, wherein
the mediator is configured, when the output region of the higher rank of preference related to the output request with lower priority does not overlap the output region assigned to the output request with higher priority, to assign the output request with lower priority the output region of the higher rank of preference related to the output request with lower priority.

7. The output processing device according to claim 1, wherein
the mediator is configured, after mediation among the output requests for the plurality of items of information, if output regions of remaining ranks of preference for each of the plurality of output requests remain unassigned to other output requests, to assign the same information having undergone the mediation also to output regions of other, increasingly low, ranks of preference.

8. An output processing device that mediates among output requests for information with respect to a plurality of output regions, the device comprising:
an accepter configured to accept the output requests for the information, the output requests respectively including:
   parameters concerning priority of output of the information and
   parameters concerning the output regions for the information;
a mediator configured to mediate, on accepting the output requests for a plurality of items of information, the output regions for the plurality of items of information respectively and output modes of the plurality of items of information respectively based on the parameters concerning priority and the parameters concerning output regions, wherein
the plurality of output requests each have a plurality of items of information to output, and
the mediator is configured to assign, in decreasing order of priority among the plurality of output requests, an output request with higher priority an output region and, if the output region overlaps, to decide to forbid output for an output request with lower priority in the overlapping output region.

9. The output processing device according to claim claim 8, wherein
the mediator is configured, if the output region overlaps, to decide to forbid output for an output request with lower priority in any of the output regions.

10. The output processing device according to claim 8, wherein
the mediator is configured, when output related to the output request with higher priority ends, to permit the output for the output request with lower priority.

11. The output processing device according to claim 10, wherein
the mediator is configured, when output related to the output request with higher priority ends, to permit the output for the output request with lower priority.

12. The output processing device according to claim 1, wherein
at least one candidate for each of the output regions is provided for each of a plurality of output devices.

13. An output processing device that mediates among output requests for information with respect to a plurality of output regions, the device comprising:
an accepter configured to accept the output requests for the information, the output requests respectively including:
   parameters concerning priority of output of the information and
   parameters concerning the output regions for the information;
a mediator configured to mediate, on accepting the output requests for a plurality of items of information, the output regions for the plurality of items of information respectively and output modes of the plurality of items of information respectively based on the parameters concerning priority and the parameters concerning output regions, wherein
a plurality of output regions are provided for each of a plurality of output devices, and all of the plurality of output regions over the plurality of output devices each have priority defined beforehand, and the mediator is configured to assign, in decreasing order of priority among the plurality of output requests, an output request with higher priority an output region with higher priority.

14. The output processing device according to claim 13, wherein the mediator is configured, when output related to the output request with higher priority ends, to move output related to an output request with lower priority to the output region with higher priority.

15. An output processing method for mediating among output requests for information with respect to a plurality of output regions, the method comprising:

accepting the output requests for the information, the output requests respectively including:

parameters concerning priority of output of the information and parameters concerning the output regions for the information;

mediating, on accepting the output requests for a plurality of items of information, the output regions for the plurality of items of information respectively and output modes of the plurality of items of information respectively based on the parameters concerning priority and the parameters concerning output regions, wherein the plurality of output requests each have a single item of information to output, the parameters concerning the output regions include ranks of preference with respect to the plurality of output regions, and the mediating of the output regions and the output modes includes assigning, in decreasing order of priority among the plurality of output requests, an output request with higher priority an output region of a higher rank of preference and, if the output region overlaps, assigning an output request with lower priority an output region of a lower rank of preference.

* * * * *